United States Patent [19]

Huang et al.

[11] Patent Number: 4,583,454
[45] Date of Patent: Apr. 22, 1986

[54] SIDE AIR FLOW FOOD PROCESSOR

[75] Inventors: Min-Nan Huang, Madison; David L. Brethorst, Lodi, both of Wis.

[73] Assignee: DEC International, Madison, Wis.

[21] Appl. No.: 634,143

[22] Filed: Jul. 24, 1984

[51] Int. Cl.[4] .............................................. A23B 4/04
[52] U.S. Cl. ...................................... 99/468; 34/191;
34/196; 34/197; 99/476; 99/482; 99/483;
126/21 A
[58] Field of Search ................... 99/467, 468, 473–476,
99/480, 482, 483; 34/191, 193, 196–197,
231–233; 219/400; 312/236; 126/21 A, 261;
426/520, 524

[56] References Cited

U.S. PATENT DOCUMENTS

| 152,788 | 7/1874 | Allen . |
| 822,990 | 6/1906 | Schroder . |
| 1,140,009 | 5/1915 | Tasjian . |
| 1,237,874 | 8/1917 | DeMartini . |
| 1,278,708 | 9/1918 | DeMartini . |
| 1,954,239 | 4/1934 | Doherty . |
| 3,261,650 | 7/1966 | Stromqvist . |
| 3,827,346 | 8/1974 | Tropp et al. . |
| 3,920,859 | 11/1975 | Foster . |
| 3,943,842 | 3/1976 | Bills et al. . |
| 4,173,079 | 11/1979 | Cruff et al. . |
| 4,307,286 | 12/1981 | Guibert . |
| 4,339,928 | 7/1982 | Guibert . |
| 4,380,977 | 4/1983 | Poux . |
| 4,384,191 | 5/1983 | Guibert . |
| 4,409,743 | 10/1983 | Jespersen et al. . |

Primary Examiner—Timothy F. Simone
Attorney, Agent, or Firm—Andrus, Sceales, Starke & Sawall

[57] ABSTRACT

A food processor (20), such as a smokehouse, cooker, dryer or the like, includes a food receiving chamber (22) having left and right ports (24 and 26) closed and opened by air flow control means provided by pivoted perforated louvers (44 and 46). For rightward horizontal air flow across flat-lying food products, the left set of louvers is closed such that air flow is restricted to passage only through the perforations or orifices (48) as an input port. The right set of louvers are open to provide lower resistance to and a higher volume of output air flow. This enables the discharge of th extra volume of water vapor due to moisture evaporating from the food in the chamber and in turn enables uniform air flow circulation and food processing without the accumulation of water vapor and consequent increased humidity in the chamber which would otherwise retard drying.

1 Claim, 4 Drawing Figures

SIDE AIR FLOW FOOD PROCESSOR

BACKGROUND AND SUMMARY

The present invention evolved from efforts to provide highly controlled uniform processing conditions in a food processor such as a smokehouse, cooker, dryer or the like. Food products typically processed include dried or dehydrated beef and beef sticks, fish, turkey, reconstituted bacon, beef chunks in stew, etc.

In a food processing chamber, moisture in the food product evaporates during a drying or heating process. The resulting water vapor increases the volume as well as the density of air leaving the processing chamber. It the amount of air entering and exiting the chamber is the same, water vapor from the food product is not efficiently withdrawn from the processing chamber. Water vapor in the chamber gradually increases, and consequently the humidity in the processing chamber increases, thus retarding the drying process.

The present invention addresses and solves the above noted and other problems regarding uniform and effective air flow and processing conditions. Uniform horizontal side air flow is provided across the surfaces of food products lying horizontally flat on pans or the like. A differential resistance to input and output air flow is established, and provides higher volume output air flow than input air flow and accommodates the extra volume of waver vapor due to moisture evaporating from the food. Perforated openings are sectionalized into a plurality of louver or damper sections. At the air supply or input side, the louvers are closed, forcing the air to enter the chamber through the perforations, or orifices in louvers achieving desirable velocity and direction of flow. At the air return side, the louvers are pivoted open, increasing the opening for air flow and reducing resistance. Bidirectional intermittent reversed flow is provided by reversing the roles of left and right sets of louvers.

DESCRIPTION OF THE INVENTION

Figure 1:
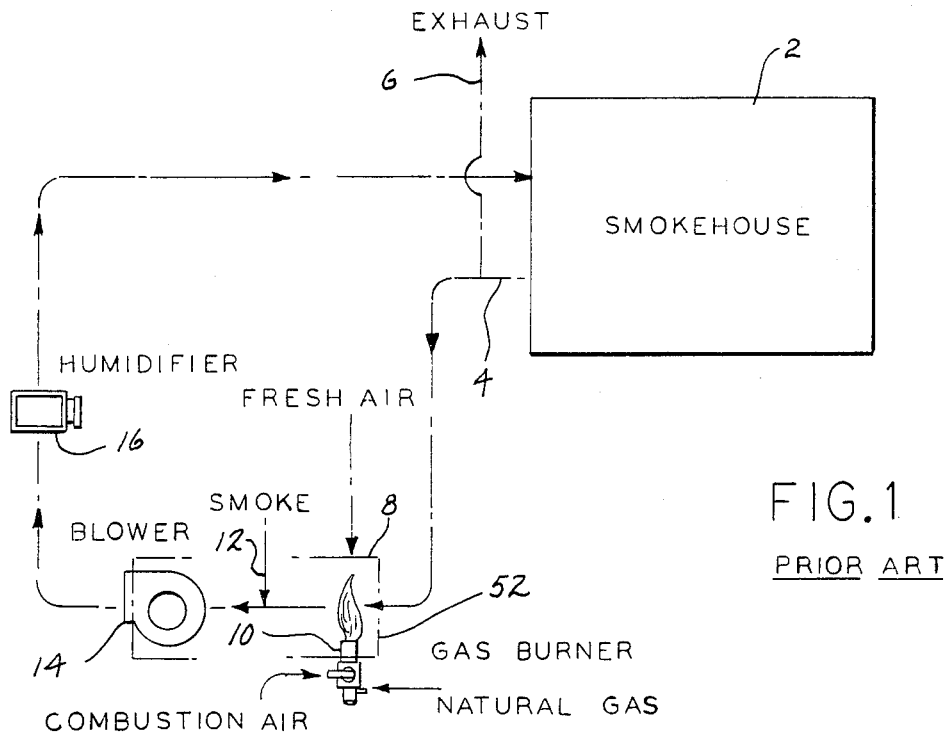
FIG. 1 is a schematic illustration of a typical smokehouse and air recirculation system, as known in the art.

Referring to FIG. 1, there is shown a food processor having a food receiving chamber 2, for example a batch type processing oven, a smokehouse for meat products, etc., for performing various processes such as smoking, controlled heating, steam cooking, drying, cold water showering, and the like. After heated air imparts its heat energy to the product and removes water vapor around the product, the air leaves the chamber at 4. A certain volume of this warm and moist air is then discharged to the atmosphere at 6, and an equivalent amount of outside fresh air is admitted at 8 into the recirculating air stream. This exchange of moist air with the outside fresh air controls the relative humidity in a conventional processing oven or chamber. The air stream then goes through a heat source such as a gas burner 10, and smoke is admitted at 12 if desired. The air stream is driven by blower 14, and humidity is further adjusted if desired at 16 before the air stream re-enters chamber 2.

Figure 2:
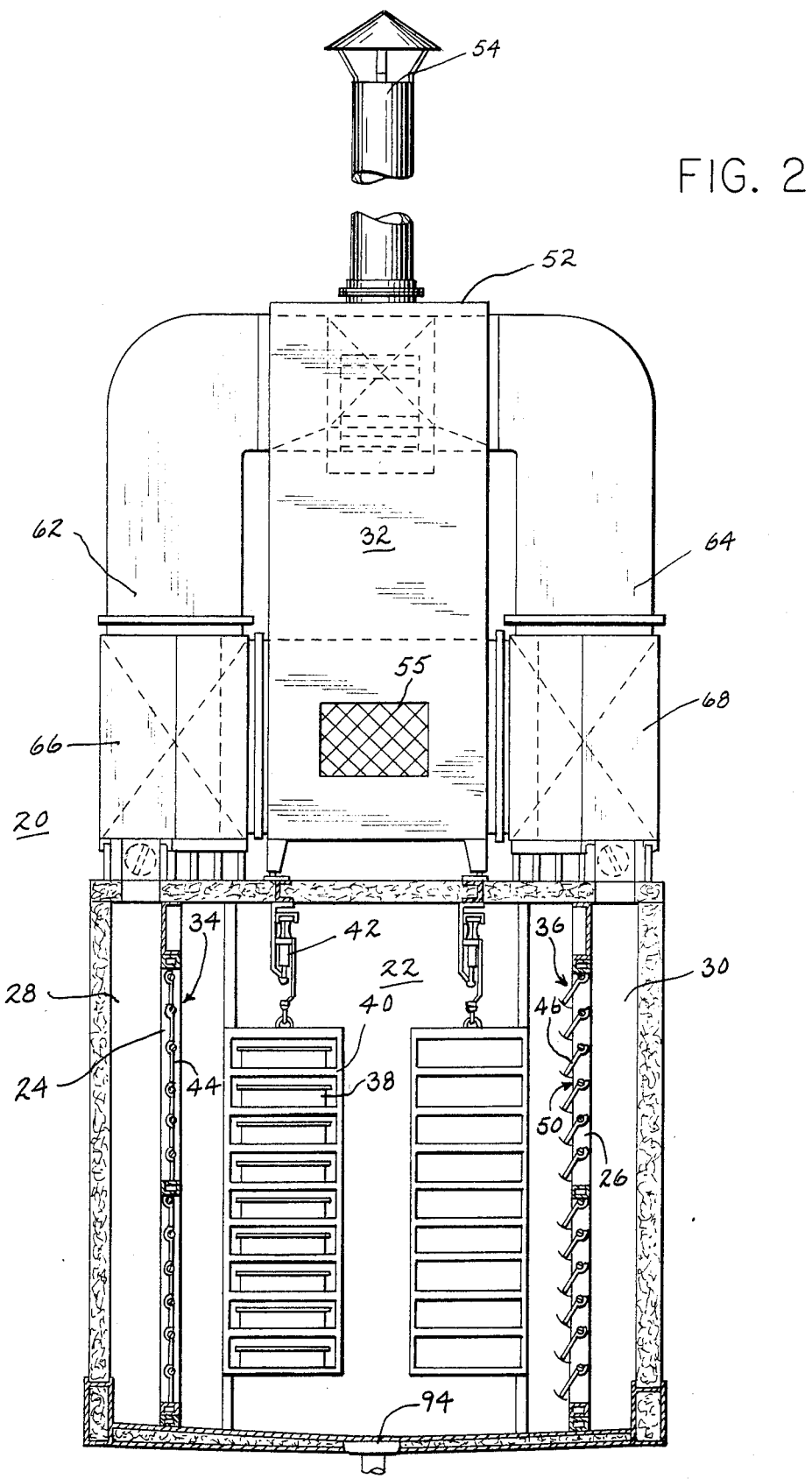
FIG. 2 is a sectional side view of a processor in accordance with the invention.

FIG. 2 shows a side air flow food processor 20 in accordance with the invention. A food receiving chamber 22 has left and right ports 24 and 26 for communicating air to and from chamber 22. A left supply-return plenum 28 communicates with the left ports 24, and a right supply-return plenum communicates with right ports 26. Air circulation means 32, described in connection with FIG. 3, has conduit means directing air flow to and from plenums 28 and 30 and ports 24 and 26. Air flow control means is provided by left and right variable differentially opening port controls 34 and 36 providing horizontal bidirectional side flow through the chamber and differential input and output flow resistance. Food products lie horizontally in flat pans or trays 38 in racks 40 suspended on hangers 40 from the ceiling of the chamber, or on floor trucks. Air flows horizontally across the surfaces of the food products.

Figure 4:
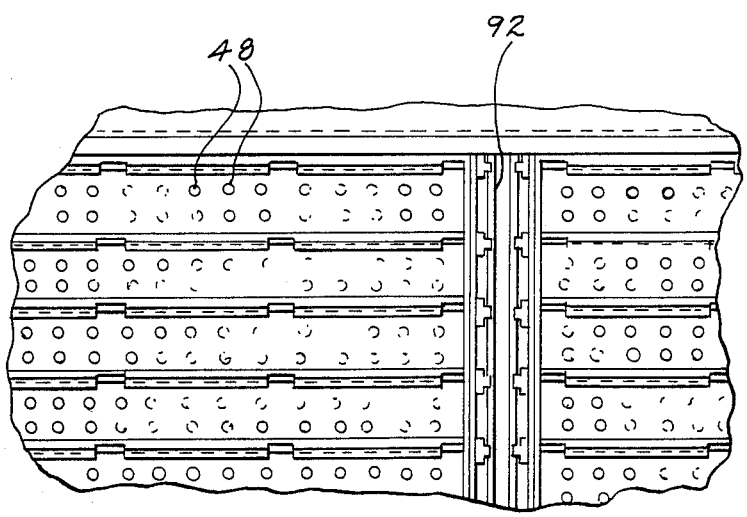
FIG. 4 is an end sectional view of a portion of FIG. 2.

The differential input and output flow resistance is provided by the left and right port controls constructed as left and right sets of perforated louvers such as 44 and 46, FIGS. 2 and 4, pivotable between port opening and closing positions. FIG. 4 shows the left set of louvers 44 with performations or orifices such as 48. In the port closing position, as shown at left set 44 in FIG. 2, the louver restricts air flow through its respective port such as 24 to passage only through the perforations, and provides an input port. In the port closing position, for example as shown at right set 46 in FIG. 2, the louver permits substantially unrestricted air flow through its respective port such as 26 within the opening such as 50 defined by open louver 46, and provides an output port. The open louver 46 provides less resistance to air flow than the closed louver 44 with passage only through perforations 48. This resistance differential provides a higher volume output air flow than input air flow and accommodates the extra volume of water vapor due to moisture evaporating from the food in the chamber. This affords uniform air flow circulation and food processing, and prevents the accumulation of water vapor and consequent increased humidity in the chamber which would otherwise retard drying.

The processor provides bidirectional intermittent reversed flow if desired by merely reversing the roles of left and right sets of louvers of louvers 44 and 46. For example, FIG. 2 shows a first mode with horizontal rightward air flow through the chamber. Left ports 24 are the input port and right ports 26 are the output port. The right output port is opened more than the left input port, i.e., left louvers 44 are closed and right louvers are opened, to provide less resistance to and a higher volume of output air flow. In a second or alternate mode, right ports 26 are an input port and left ports 24 are an output port. The left output port is opened more than the right input port, i.e., left louvers 44 are opened and right louvers 46 are closed, to provide less resistance to and a higher volume of output air flow.

Figure 3:
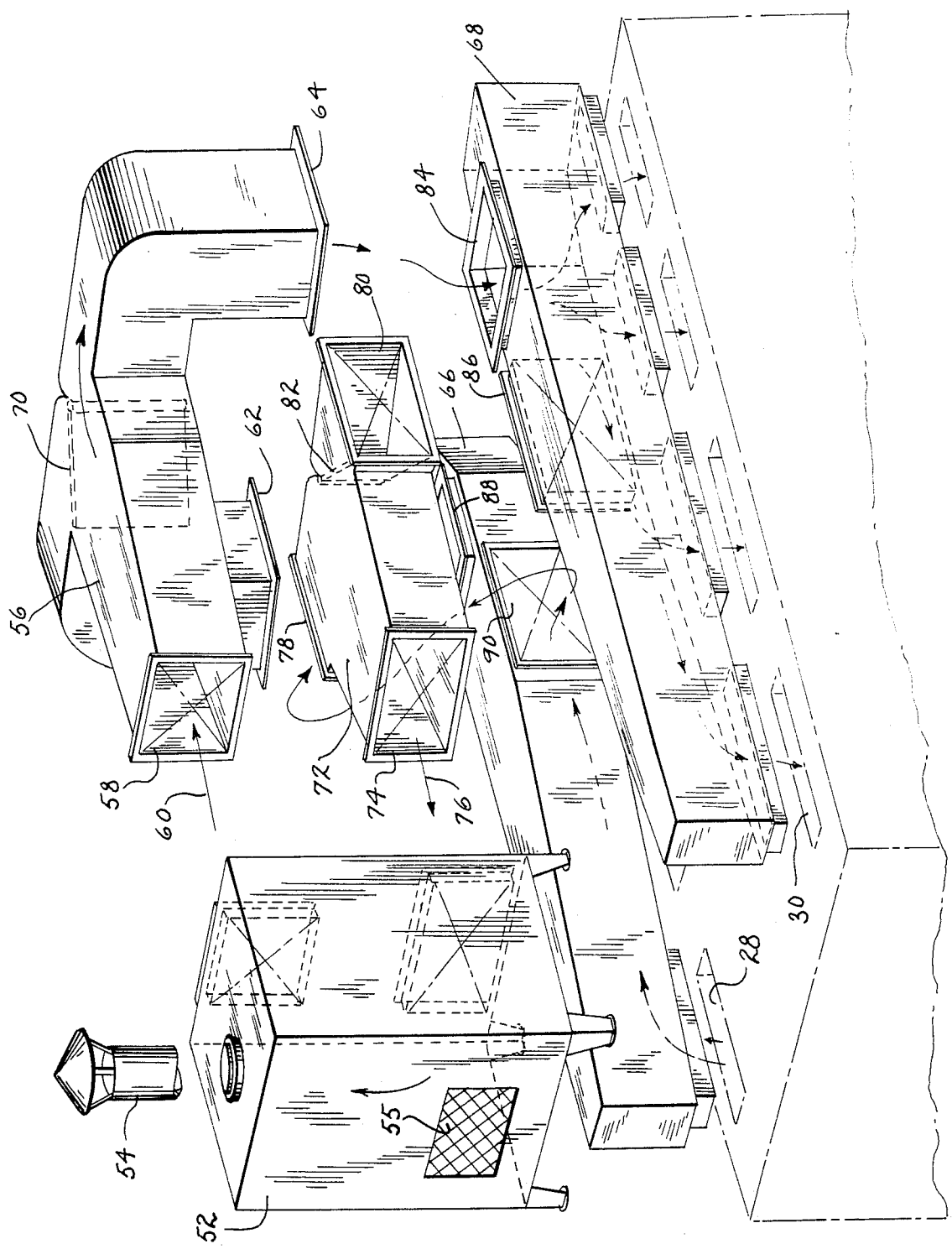
FIG. 3 is an isometric illustration of a portion of FIG. 2.

FIG. 3 shows a cabinet 52, which may be like that shown in FIG. 1, housing a blower such as 14 and a heat source such as 10 and including an exhaust chimney 54 and fresh air inlet 55. A supply air cross-connection plenum 56 has an input duct 58 receiving air unidirectionally as shown at 60 from the blower in cabinet 52. Plenum has a pair of output ducts 62 and 64 connected by respective conduits 66 and 68 to respective left and right supply-return plenums 28 and 30 of chamber 22. A supply baffle 70 is selectively pivotable in plenum 56 between first and second positions to selectively direct air flow from input duct 58 to one of the other of output ducts 62 and 64 for passage to one or the other of supply-return plenums 28 and 30. Return air cross-connection plenum 72 has an output duct 74 returning air unidirectionally as shown at arrow 76 to the blower in cabinet 52. Plenum 72 has a pair of input ducts 78 and 80 connected by respective conduits 66 and 68 to respective left and right supply-return plenums 28 and 30 of chamber 22. Return baffle 82 is selectively pivotable in plenum 72 between first and second positions to direct air to output duct 74 selectively from one or the other of input ducts 78 and 80 passing from one or the other of supply-return plenums 28 and 30 of chamber 22. Conduit 68 is connected to duct 64 at opening 84 and is connected to duct 80 at opening 86. Conduit 66 is connected to duct 62 at opening 88 and is connected to duct 78 at opening 90.

The processor has the noted first mode providing horizontally rightward air flow through chamber 22. Supply baffle 70 is in a rightwardly pivoted first position, oppositely to that shown in FIG. 3, directing air flow from input duct 58 to output duct 62 connected by conduit 66 to left supply-return plenum 28 of chamber 22, and blocking air flow to the other output duct 64 connected to right supply-return plenum 30. Return baffle 82 is in a leftward pivoted second position, oppositely to that shown in FIG. 3, directing air flow to output duct 74 from input duct 80 connected by conduit 68 to right supply-return plenum 30 of chamber 22, and blocking air flow from input duct 78 connected to left supply-return plenum 28. The left set of louvers 44 are pivoted toward and against the left ports 24 to a closed position and the right set of louvers 46 are pivoted away from right ports 26 to an open position, as shown in FIG. 2. Air flows from the blower in cabinet 52 through input duct 58 of supply air cross-connection plenum 56 through the one output duct 62 of plenum 56 through conduit 66 through left supply-return plenum 28 through perforations 48 in the left set of louvers 44 then horizontally rightwardly through chamber 22 to right ports 26 through right supply-return plenum 30 through conduit 68 through the other input duct 80 of the return air cross-connection plenum 72 through output duct 74 to return to the blower in cabinet 52 for recirculation.

The processor has the noted second or alternate mode providing horizontal leftward air flow through chamber 22. Supply baffle 70 is in its leftward pivoted second position as shown in FIG. 3 directing air flow from input duct 58 of plenum 56 to output duct 64 connected by conduit 68 to right supply-return plenum 30 of chamber 22, and blocking air flow to output duct 62 connected to left supply-return plenum 28. Return baffle 82 is in its rightward pivoted first position as shown in FIG. 3 directing air flow to output duct 74 of plenum 72 from input duct 78 connected by conduit 66 to left supply-return plenum 28, and blocking air flow from the other input duct 80 connected to right supply-return plenum 30. The right set of louvers 46 are pivoted toward and against right ports 26 to a closed position, and the left set of louvers 44 are pivoted away from left ports 24 to an open position. Air flows from the blower in cabinet 52 through input duct 58 of plenum 56 through output duct 64 through conduit 68 through right supply-return plenum 30 through the perforations or orifices in right louvers 46 then horizontally leftwardly through chamber 22 to left ports 24 then through left supply-return plenum 28 through conduit 66 through input duct 78 of plenum 72 through output duct 74 to return to the blower in cabinet 52 for recirculation.

In a typical implementation, the air flow through chamber 22 is reconditioned 10 to 20 times per minute. The direction of air flow in the chamber is reversed 1 to 5 times per minute. The air velocity through the perforations or orifices such as 48 in the louvers is 400 to 1000 feet per minute. The respective sets of louvers may be interlocaked and pivoted synchronously as by connector rods such as 92. The degree of opening of the louvers may be controlled or modulated if desired according to sensed humidity within chamber 22, as by a humidistat or the like. Drain pipe 94 provides drainage for water flushing or the like, to faciliate cleaning of the chamber.

It is recognized that various alternatives and modifications are possible within the scope of the appended claims.

We claim:
1. A side air flow processor comprising:
a reception chamber having left and right port means for communicating air to and from said chamber, a left supply-return plenum communicating with said left port means, and a right supply-return plenum communicating with said right port means;
a blower;
a supply air cross-connection plenum having an input duct receiving air unidirectionally from said blower, and having a pair of output ducts each connected by conduit means to a respective one of said left and right supply-return plenums of said chamber;
supply baffle means selectively movable in said supply air cross-connection plenum between first and second positions to selectively direct air from its said input duct to one or the other of its said output ducts for passage to one or the other of said supply-return plenums of said chamber;
a return air cross-connection plenum having an output duct returning air unidirectionally to said blower, and having a pair of input ducts each connected by conduit means to a respective one of said left and right supply-return plenums of said chamber;
return baffle means selectively movable in said return air cross-connection plenum between first and second positions to direct air to its said output duct selectively from one or the other of its said input ducts passing from one or the other of said supply-return plenums of said chamber;
left and right sets of one or more perforated louvers pivotably mounted at respective said left and right port means, each louver being pivotable toward and against its respective said port means to restrict air flow through that port means to only air flowing through the perforations in the louver, each louver also being pivotable away from its respective said port means to provide increased air flow passage area and enable higher volume air flow through that ports means;
said processor having a first mode with:
said supply baffle means in said first position directing air flow from said input duct of said supply air cross-connection plenum to said one output duct of said supply air cross-connection plenum connected by said conduit means to said left supply-return plenum of said chamber, and blocking air flow to said other output duct of said supply air cross-connection plenum connected to said right supply-return plenum of said chamber;

said return baffle means in said second position directing air flow to said output duct of said return air cross-connection plenum from said other input duct of said return air cross-connection plenum connected by said conduit means to said right supply-return plenum of said chamber, and blocking air flow from said one input duct of said return air cross-connection plenum connected to said left supply-return plenum of said chamber;

said left set of louvers pivoted toward and against said left port means;

said right set of louvers pivoted away from said right port means, such that air flows from said blower through said input duct of said supply air cross-connection plenum through said one output duct of said supply air cross-connection plenum through said left supply-return plenum of said chamber through said perforations in said louvers of said left set then horizontally rightwardly through said chamber to said right port means then through said right supply-return plenum of said chamber through said other input duct of said return air cross-connection plenum through said output duct of said return air cross-connection plenum to said blower;

said supply baffle means in said first position blocking air flow from said right supply-return plenum and said other output duct of said supply air cross-connection plenum;

said return baffle means in said second position blocking air flow to said one input duct of said return air cross-connection plenum and said left supply-return plenum of said chamber;

said processor having a second mode with:

said supply baffle means in said second position directing air flow from said input duct of said supply air cross-connection plenum to said other output duct of said supply air cross-connection plenum connected by said conduit means to said right supply-return plenum of said chamber, and blocking air flow to said one output duct of said supply air cross-connection plenum connected to said left supply-return plenum of said chamber;

said return baffle means in said first position directing air to said output duct of said return air cross-connection plenum from said one input duct of said return air cross-connection plenum connected by said conduit means to said left supply-return plenum of said chamber, and blocking air flow from said other input duct of said return air cross-connection plenum connected to said right supply-return plenum of said chamber;

said right set of louvers pivoted toward and against said right port means;

said left set of louvers pivoted away from said left port means, such that air flows from said blower through said input duct of said supply air cross-connection plenum through said other output duct of said supply air cross-connection plenum through said right supply-return plenum of said chamber through said perforations in said louvers of said right set then horizontally leftwardly through said chamber to said left port means then through said left supply-return plenum of said chamber through said one input duct of said return air cross-connection plenum through said output duct of said return air cross-connection plenum to said blower;

said supply baffle means in said second position blocking air flow from said left supply-return plenum and said one output duct of said supply air cross-connection plenum;

said return baffle means in said first position blocking air flow to said other input duct of said return air cross-connection plenum and said right supply-return plenum of said chamber.

* * * * *

UNITED STATES PATENT AND TRADEMARK OFFICE
CERTIFICATE OF CORRECTION

PATENT NO. : 4,583,454
DATED : April 22, 1986
INVENTOR(S) : MIN-NAN HUANG ET AL

It is certified that error appears in the above-identified patent and that said Letters Patent is hereby corrected as shown below:

In the Abstract, line 11, delete "th" and insert --the--

In Column 1, line 14, delete "It" and insert --If--

In Column 2, line 25, delete "performations" and insert --perforations--

In Column 2, line 46, after "right sets" delete "of louvers"

In Column 2, line 65, after "Plenum" insert --56--

In Column 3, line 2, delete "of" and insert --or--

In Column 4, line 10, delete "interlocaked" and insert --interlocked--

Signed and Sealed this

Second Day of September 1986

[SEAL]

Attest:

DONALD J. QUIGG

Attesting Officer

Commissioner of Patents and Trademarks